United States Patent
Serravalle

(10) Patent No.: US 9,386,500 B2
(45) Date of Patent: *Jul. 5, 2016

(54) INTER-NETWORK HANDOVER SYSTEM AND METHOD

(71) Applicant: LENOVO INNOVATIONS LIMITED (HONG KONG), Quarry Bay (HK)

(72) Inventor: Francesca Serravalle, London (GB)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/153,619

(22) Filed: Jan. 13, 2014

(65) Prior Publication Data

US 2014/0200007 A1 Jul. 17, 2014

Related U.S. Application Data

(66) Continuation of application No. 12/736,267, Substitute for application No. PCT/JP2009/056030, filed on Mar. 18, 2009, now Pat. No. 8,634,380.

(30) Foreign Application Priority Data

Mar. 25, 2008 (GB) .................................. 0805436.3

(51) Int. Cl.
*H04W 4/00* (2009.01)
*H04W 36/00* (2009.01)
*H04W 36/38* (2009.01)

(52) U.S. Cl.
CPC ............ *H04W 36/385* (2013.01); *H04W 36/00* (2013.01); *H04W 36/0005* (2013.01); *H04W 36/0055* (2013.01); *H04W 36/0061* (2013.01); *H04W 36/0066* (2013.01)

(58) Field of Classification Search
None
See application file for complete search history.

(56) References Cited

U.S. PATENT DOCUMENTS 5,673,260 A 9/1997 Umeda et al.
6,714,784 B1 * 3/2004 Forssell et al. ............... 455/436
(Continued)

FOREIGN PATENT DOCUMENTS

JP 2001-36941 A 2/2001
JP 2008-547353 A 12/2008
(Continued)

OTHER PUBLICATIONS

Digital cellular telecommunications system (Phase 2+); Universal Mobile Telecommunications System (UMTS); Numbering, addressing and Identification, 3GPP TS 23.003 version 7.6.0 Release 7, ETSI TS 123 003 V7.6.0 (Jan. 2008).

(Continued)

*Primary Examiner* — Ayaz Sheikh
*Assistant Examiner* — Tarell Hampton

(57) ABSTRACT

A method includes receiving, from a user device, a global cell identifier of a cell in the second communications network, wherein information for forming a Location Area Identification 'LAI' can be obtained from the global cell identifier, and a Routing Area Code 'RAC' for use in identifying a target gateway component operating within a location area represented by the Location Area Identification 'LAI' and associated with the neighbor base station component, generating a handover request message in the first communications network, for handing over to the neighbor base station component operating as the target base station component, the handover request message incorporating the Routing Area Code 'RAC' and the Location Area Identification 'LAI', and transmitting the handover request message to facilitate the handover to the second communications network.

20 Claims, 10 Drawing Sheets

(56) References Cited

U.S. PATENT DOCUMENTS

| | | |
|---|---|---|
| 2007/0116011 A1 | 5/2007 | Lim et al. |
| 2007/0213059 A1 | 9/2007 | Shaheen |
| 2007/0249352 A1 | 10/2007 | Song et al. |
| 2008/0188223 A1 | 8/2008 | Vesterinen et al. |
| 2010/0054187 A1 | 3/2010 | Hallenstal et al. |
| 2010/0255846 A1 | 10/2010 | Vikberg et al. |

FOREIGN PATENT DOCUMENTS

| | | |
|---|---|---|
| JP | 2008547353 A | 12/2008 |
| JP | 2009-529830 A | 8/2009 |
| WO | WO 95/22213 A1 | 8/1995 |
| WO | 0048417 | 8/2000 |
| WO | WO 00/48417 A1 | 8/2000 |
| WO | 0130109 A1 | 4/2001 |
| WO | WO 01/30109 A1 | 4/2001 |
| WO | 2007007990 A1 | 1/2007 |
| WO | 2007011983 A1 | 1/2007 |
| WO | WO 2007/007990 A1 | 1/2007 |
| WO | WO 2007/011983 A1 | 1/2007 |
| WO | 2007103369 A2 | 9/2007 |
| WO | WO 2007/099437 A1 | 9/2007 |
| WO | WO 2007/103369 A2 | 9/2007 |
| WO | WO 2007/103369 A3 | 9/2007 |
| WO | WO 2007/103496 A1 | 9/2007 |

OTHER PUBLICATIONS

Ericsson: "Requirements for automatic neighbour relations", 3GPP Draft; 55-080409, TSG-SA5 (Telecom Management), Meeting SA5#58, Feb. 18-22, 2008, St Julian.

Qualcomm Europe, et al., "Inter-Rat/Frequency Automatic Neighbour Relation Function", R3-072117, 3GPP TSG-RAN WG3 Meeting #58, Nov. 5-9, 2007, Jeju Island, Korea, Qualcomm Europe, T-Mobile.

Japanese Office Action dated Aug. 1, 2012, with English translation.

European Search Report dated Dec. 21, 2012.

Japanese Office Action dated Sep. 25, 2013, with English-language translation of relevant part of the Office Action.

$3^{rd}$ Generation Partnership Project: Technical Specification Group Core Network and Terminals: Numbering, addressing and identification, 3GPP TS 23.003 V7.6.0, Dec. 2007, pp. 15-18.

International Search Report dated Sep. 11, 2009 in PCT/JP2009/056030.

Non-Final Office Action dated Mar. 12, 2013 in U.S. Appl. No. 12/736,267.

Notice of Allowance dated Sep. 9, 2013 in U.S. Appl. No. 12/736,267.

Japanese Office Action dated Dec. 11, 2013 with partial English translation thereof.

Nortel Networks, NACC-Global RNC-Id and GERAN Cell Identifier, TSG-RAN Working Group 3 #41bis, Mar. 30, 2004, R3-040596 (scientific literature etc., 2013-10058-013).

T-Mobile, Huawei, Network support to ensure UE autonomous CSG discovery after change of macro cell identification, 3GPP TSG RNA2 #61bis, Mar. 31, 2008, R2-081907 (scientific literature etc., 2012-10062-485).

* cited by examiner

INTER-NETWORK HANDOVER SYSTEM AND METHOD

INCORPORATION BY REFERENCE

The present application is a Continuation application of U.S. patent application Ser. No. 12/736,267, filed on Sep. 24, 2010, which is based on and claims priority under 35 U.S.C. §119 or §365 from United Kingdom Patent Application No. 0805436.3, filed on Mar. 25, 2008, the entire contents of which are incorporated herein by reference. The present application also claims the benefit under 35 U.S.C. §120 of Patent Cooperation Treaty Application PCT/JP2009/056030, which was filed on Mar. 18, 2009, the entire contents of which are incorporated herein by reference. The parent U.S. patent application Ser. No. 12/736,267 is a national stage entry of Patent Cooperation Treaty Application PCT/JP2009/056030.

TECHNICAL FIELD

The present invention relates to connections in communications networks, particularly but not exclusively networks operating according to the 3GPP standards or equivalents or derivatives thereof.

BACKGROUND ART

As the requirements and operation of communications systems have changed, several different types of telecommunications networks have been developed. One type of network is a Universal Terrestrial Radio Access Network (UTRAN). In addition, Evolved-UTRAN or E-UTRAN networks are being developed based on UTRAN, but with increased flexibility, simplified architecture and other advantages for users and service providers. Some items of user equipment (UE) are able to connect both to UTRAN and to E-UTRAN networks. Therefore, it is desirable if the different network types interwork. In particular, it would be advantageous if components of one network type could perform handover of a UE to components of another network type.

DISCLOSURE OF INVENTION

According to one aspect, there is provided a method of facilitating handover of a user device between a source base station component in a first communications network of a first network type and a target base station component in a second communications network of a second network type, the method comprising:
 determining a gateway identifier of at least one target gateway component connected to the target base station component in the second communications network;
  generating a handover request message in the first communications network, the handover request message incorporating the gateway identifier of the at least one target gateway component; and
  transmitting the handover request message to the second communications network.
 Hence handover of the user device from the network of the first type to the network of the second type is enabled by the source base station component addressing the target gateway component using the gateway identifier.

According to a further aspect, there is provided a method of operating a gateway device in a second communications network of a first type, the method comprising:
 receiving a first handover request message from a source base station component;
 extracting a cell identifier from the handover request message; obtaining an identifier of a target base station component based on the cell identifier; and
 generating a second handover request message and forwarding the second handover request message to the target base station component.

This aspect advantageously enables a gateway device of a target network, such as a target SGSN, to handle handover of a UE from a source base station component to a target base station component without the source base station component having to be aware of an identifier for the target base station component.

According to a further aspect, there is provided a method of operating a user device in a first communications network, the method comprising: receiving a request from a base station component of the first communications network for information relating to a cell in a second communications network; obtaining a cell identifier of the cell in the second communications network; obtaining an identifier of a gateway component associated with the cell in the second communications network; and
 transmitting the cell identifier and the identifier of the gateway component to the base station component of the first communications network.

The present aspect may enable a user device to obtain the necessary information to enable handover of the user device from a component in a network of a first type to a component in a network of a second type.

According to a further aspect, there is provided a method of operating a user device in a first communications network, the method comprising: receiving a request from a first base station component of the first communications network for information relating to a cell in a second communications network;
 obtaining a cell identifier of the cell in the second communications network;
 obtaining an identifier of a second base station component associated with the cell in the second communications network; and
 transmitting the cell identifier and the identifier of the second base station component to the first base station component of the first communications network.

In the present aspect, the user device may therefore obtain all of the information necessary to facilitate handover of the user device to the second network. In particular, the identifier of the second base station component to which the user device is being handed over.

According to a further aspect, there is provided a method of operating a first base station component in a first communications network, the method comprising:
 transmitting a request to a user device operating in the first communications network for information relating to a cell in a second communications network;
 receiving a cell identifier of the cell in the second communications network; and
 obtaining an identifier of a second base station component associated with the cell in the second communications network.

This aspect enables a base station component to obtain information necessary for handover of a UE to a component in a second network without any changes or additional steps being taken in the UE.

The various acronyms applicable in the telecommunications network will of course be familiar to those skilled in the art, but a glossary is appended for the benefit of lay readers. Although for efficiency of understanding for those of skill in the art the invention will be described in detail in the context of a E-UTRAN and UTRAN system, the principles of the identifier system can be applied to other systems, e.g. 3G, CDMA or other wireless systems in which base station components, such as eNodeB components, communicate with each other or with other devices, such as gateway devices, in the telecommunications network, with the corresponding elements of the system changed as required. The present methods and systems may also be implemented in wireless local area networks (WLANs) or other local or wide area networks (LANs or WANs).

Aspects of the invention are set out in the independent claims. Preferred features of the aspects are set out in the dependent claims. The invention provides, for all methods disclosed, corresponding computer programs or computer program products for execution on corresponding equipment, the equipment itself (user equipment, nodes, networks or components thereof, including gateway and base station nodes for carrying out the methods described) and methods of configuring and updating the equipment. Features of one aspect may be applied to other aspects.

Exemplary embodiments of the systems and methods described herein will now be described in more detail with reference to the accompanying figures in which:

BEST MODE FOR CARRYING OUT THE INVENTION

The following description sets out a number of specific exemplary embodiments of the method and system claimed herein. It will be clear to one skilled in the art that variations of the features and method steps may be provided and that many of the features described are not essential to the invention.

Figure 1:
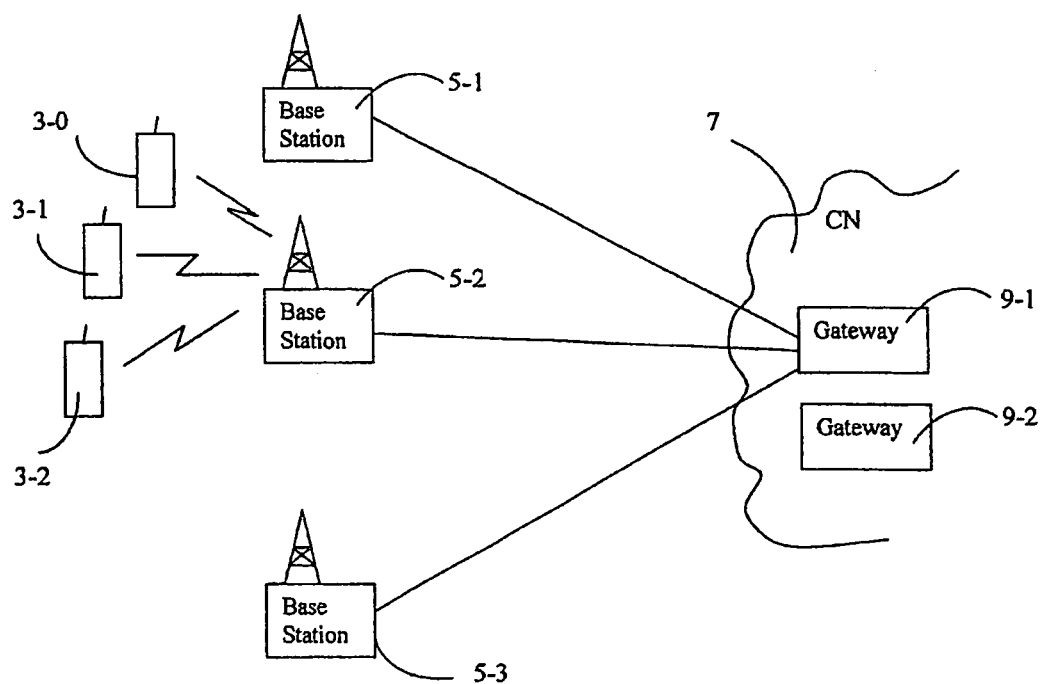
FIG. 1 is a schematic diagram of a portion of a E-UTRAN network.

FIG. 1 schematically illustrates a mobile (cellular) telecommunication system 1 according to the E-UTRAN protocol in which users of mobile (or cellular) telephones (MT) 3-0, 3-1, and 3-2 (which may be termed user devices or user equipment (UE)) can communicate with other users (not shown) via one of the base stations 5-1, 5-2 or 5-3 (which may be termed eNodeBs or eNBs) and a telephone network 7 or Core Network (CN). The telephone network 7 includes a plurality of components including gateway components 9-1, 9-2, in one exemplary embodiment MMEs. It will be appreciated by the skilled person that the each base station 5-1, 5-2, 5-3 may connect to the telephone network 7 via either gateway 9-1, 9-2 and that all base stations 5-1, 5-2, 5-3 may connect via the same gateway 9-1, 9-2. Similarly, each mobile telephone 3 may connect to the telephone network 7 via either base station 5 and that all mobile telephones 3 may connect via the same base station 5.

When a mobile telephone 3 enters the network 7, for example by being switched on, a connection is established between the mobile telephone 3 and a base station 5 and between the base station 5 and a gateway device 9. This enables communication between the mobile telephone 3 and other components in the network 7.

Also, when a mobile telephone 3 moves from the cell of a source base station (e.g. base station 5-1) to a target base station (e.g. base station 5-2), a handover procedure (protocol) is carried out in the source and target base stations 5 and in the mobile telephone 3, to control the handover process. The handover is enabled by the establishment of a connection between the source and target base stations 5. As part of the handover process, the gateway device 9-1, 9-2 via which communications from a mobile telephone 3 are transmitted to the telephone network may change. Alternatively, the gateway device 9-1, 9-2 through which communications are transmitted may remain the same, but the base station 5-1, 5-2 to which the mobile device is connected may change. These transfers are also enabled by the establishment of connections between the base stations 5 and the gateways 9.

An E-UTRAN protocol network may also be termed an LTE or Long Term Evolution of UTRAN network.

Figure 2:
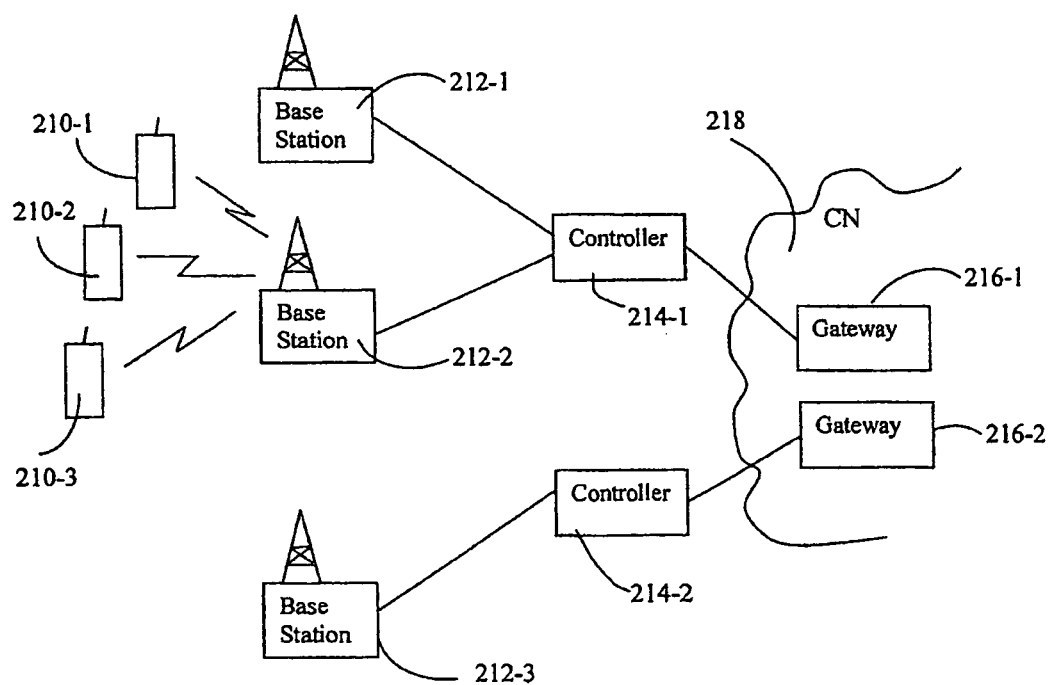
FIG. 2 is a schematic diagram of a portion of a UTRAN network.

FIG. 2 schematically illustrates a mobile (cellular) telecommunication system 2 according to the UTRAN protocol in which users of mobile (or cellular) telephones (MT) 210-1, 210-2 and 210-3 (which may be termed user devices or user equipment (UE)) can communicate with other users (not shown) via one of the base stations 212-1, 212-2 and 212-3 (which may be termed NodeBs or NBs). Each of the base stations is associated with a network controller 214-1, 214-2, or RNC (Radio Network Controller), which is then connected to a telephone network 218 or Core Network (CN). The telephone network 218 includes a plurality of components including gateway components 216-1, 216-2, in one embodiment SGSNs.

In a UTRAN network, handover of UEs may also be performed between base stations. The handover of a UE between base stations in a UTRAN network may also involve a handover between controllers in the network and a handover between gateway components in the network.

A UTRAN protocol network may also be referred to as a UMTS network (Universal Mobile Telecommunications System network).

Each type of telecommunications network may be termed a Radio Access Technology (RAT).

One skilled in the art will appreciate that each type of network may include fewer or additional network components and FIGS. 1 and 2 are not intended to be limiting in any way.

One exemplary embodiment of the Automatic Neighbour Relation (ANR) function will now be described with reference to FIG. 3. This process enables a base station, such as an eNB in an LTE network, to discover information relating to neighbour cells. In a situation where different types of networks overlap, ANR enables an eNB to look for neighbour cells using different Radio Access Technologies (RATs) or different frequencies.

Figure 3:
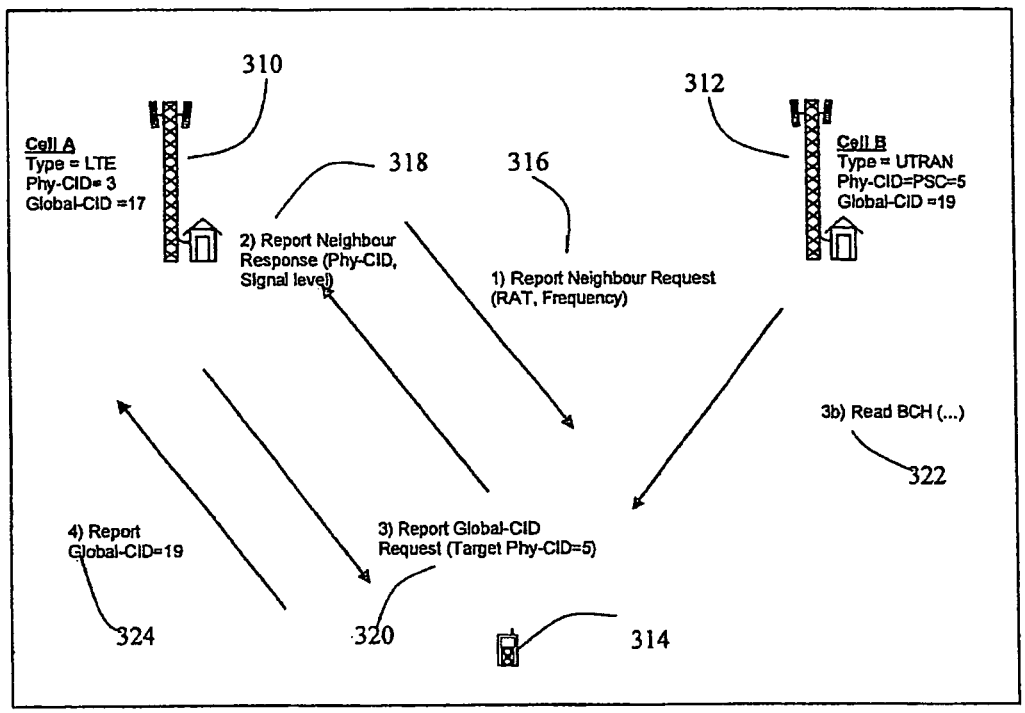
FIG. 3 illustrates an Automatic Neighbour Relation process.

As illustrated in FIG. 3, a first base station 310 in an LTE network may use the process to determine whether there are other neighbouring base stations in the area, for example base stations that are part of other types of networks.

The base station 310 sends a Report Neighbour Request message 316 to a user device (UE) 314 that is connected to the base station 310, requesting that the UE 314 reports the presence of any neighbouring base stations to the first base station 310.

The UE 314 sends a Report Neighbour Response message 318 to the first base station 310 reporting the presence of a second base station 312, which is part of a different type of network, in this case a UTRAN network. The response message 318 includes information relating to the second base station 312, such as the signal level from the second base station and the Physical-layer Cell Identity (Phy-CID) of the base station 312.

The first base station 310 may then request further information about the second base station 312 by sending a Report Global Cell Identity (Global-CID) Request 320 to the UE 314, identifying the second base station using the Phy-CID supplied in the Report Neighbour Response message 318.

The UE 314 obtains the Global-CID information 322 from the second base station 312 and reports this information back to the first base station 310 using a Report Global-CID message 324.

The first base station 310 then updates its Inter-Radio Access Technology (Inter-RAT) neighbour relation list, which it maintains in memory, to store details of the new neighbour node.

Figure 4:
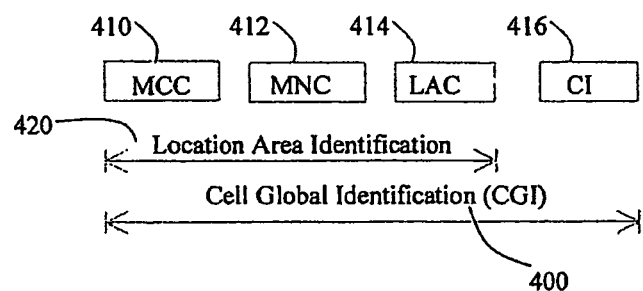
FIG. 4 is a schematic illustration of a Global Cell Identity message.

The UE 314 obtains the Global-CID information from the second base station from a Global-CID message 400 that the second base station broadcasts from time to time. One example of a Global-CID message 400 is illustrated in FIG. 4. The message includes information locating the cell to which it relates. In particular, the Mobile Country Code (MCC) 410, which identifies the country of the cell, the Mobile Network Code (MNC) 412, which identifies the carrier or network operator associated with the cell, and the Location Area Code (LAC) 414, which identifies a group of cells within the network. This information together forms the Location Area Identification (LAI) 420. The Global-CID message 400 further includes the Cell Identity (CI) 416. As noted above, the Global-CID information is broadcast in each cell.

Figure 5:
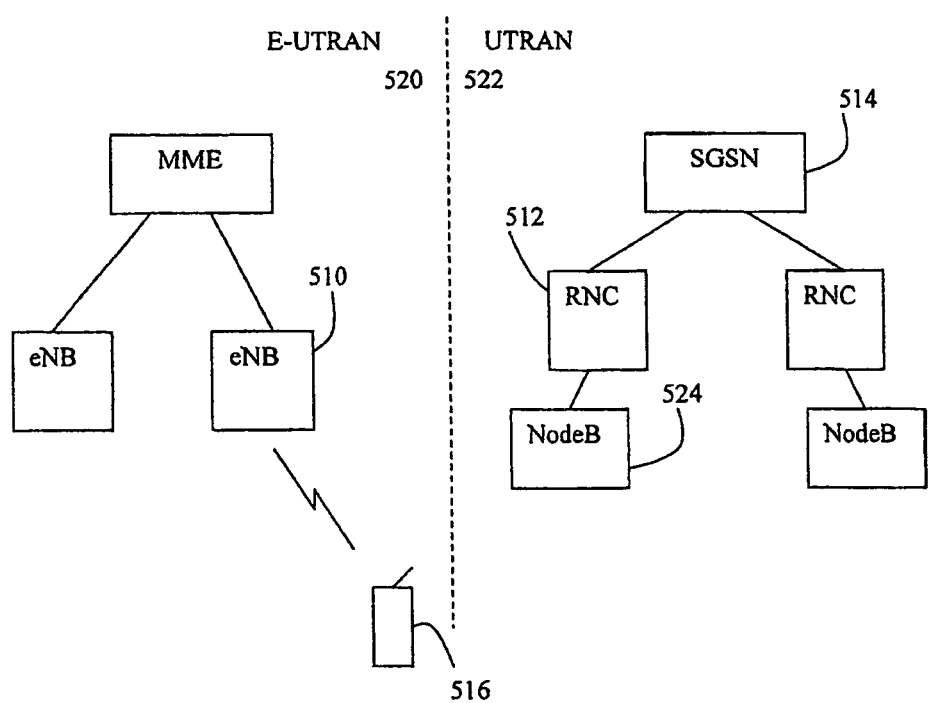
FIG. 5 illustrates an Inter-RAT handover according to one embodiment.

A specific example of how a source eNB 510 in a E-UTRAN or LTE network 520 performs handover of a UE 516 to a NodeB 524 and RNC 512 in a UTRAN network 522 is set out below with reference to FIG. 5.

As set out above, the eNB 510 in the E-UTRAN network 520 determines the existence of a cell in a UTRAN network 522 via the UE 516 using the ANR method described above. The eNB 510 obtains and stores information provided in the Global-CID of the UTRAN cell.

In order for the source eNB 510 to hand over the UE 516 to the UTRAN target RNC 512, the eNB 510 needs to address the SGSN 514 associated with the target cell and, in some embodiments as described in more detail below, to provide information for the SGSN to address the target RNC. However, the Global-CID does not contain sufficient information to enable the source eNB 510 to address the target SGSN 514.

In order to address the target SGSN 514, the MCC and MNC (which together form the Public Land Mobile Network (PLMN) ID), and the LAC are required and these can be obtained from the Global-CID. However, to address the target SGSN 514, the source eNB 510 also needs the Routing Area Code (RAC) associated with the target SGSN 514. This additional information is needed since one location area (identified by the LAC) may cover more than one SGSN service area, as illustrated in FIG. 6.

Figure 6:
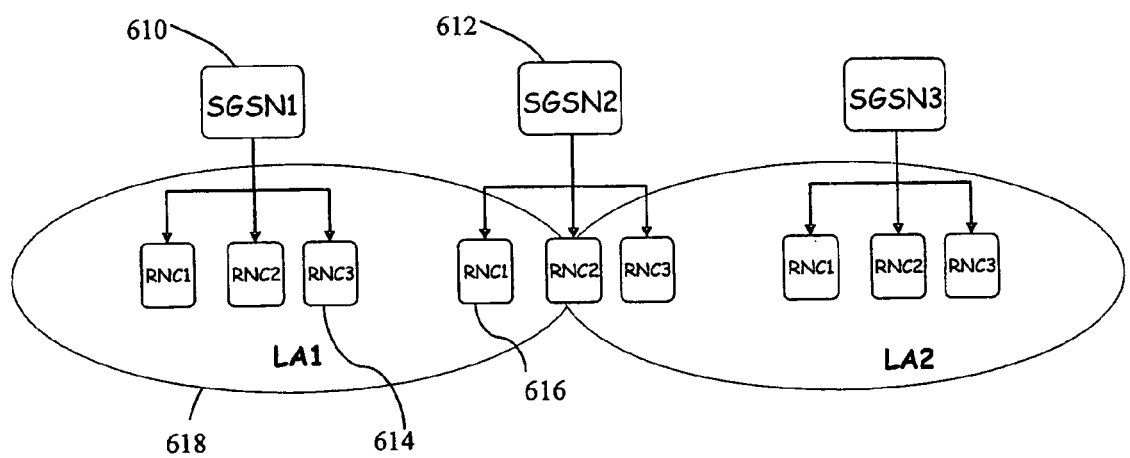
FIG. 6 illustrates a relationship between Location Areas and SGSN serving areas.

FIG. 6 illustrates the situation in which a plurality of SGSNs service a single location area. For example RNC3 614, serviced by SGSN1 610 and RNC1 616 serviced by SGSN2 612 are within the same location area, LA1 618. Therefore an LAC identifying LA1 618 would not uniquely identify an SGSN, since SGSN1 610 and SGSN2 612 are both within LA1. However, the RAC is not included in the Global-CID obtained by the UE.

In the present exemplary embodiment, therefore, the UE 516 is arranged to obtain the RAC of the target cell and report this information to the source eNB 510 together with the Global-CID. In order to obtain the RAC, the UE 516 reads the RAC from the core network (CN) system information in the System Information Block 1 (SIB 1). SIB 1 is one of a number of system information blocks broadcast by the target cell in order to provide information about the target cell.

The UE 516 is preferably pre-programmed, on receipt of a "Report Global-CID Request" message from a source eNB 510, to obtain both the Global-CID information and the RAC from information periodically broadcast by UTRAN cell.

In an alternative embodiment, the source eNB 510 may specifically request the UE 516 to obtain the RAC, either in the Report Global-CID request message or as a separate message.

The source eNB 510 can then use the RAC obtained by the UE 516 to address the target SGSN 514, enabling the handover of the UE 516 to the target SGSN 514. It is noted that the source eNB 510 also needs to use information from the Global-CID, in particular the LAI, to address the target SGSN in addition to the RAC.

Figure 7:
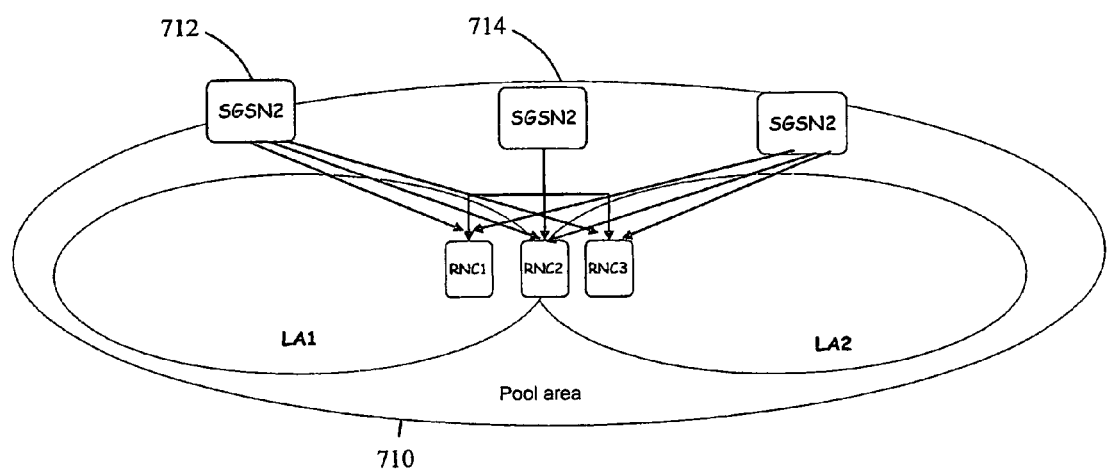
FIG. 7 is a schematic diagram of an Iu Flex scenario.

With reference to FIG. 7, in an Iu Flex network, in which a many-to-many relationship between SGSNs and RNCs is permitted within a pool area, a single RNC 710 may be served by more than one SGSN, e.g. SGSNs 712 and 714. Therefore the RAC no longer necessarily identifies a single SGSN. In this embodiment, preferably the RAC is assumed to address the default SGSN within the pool area, for example SGSN 712 in FIG. 7.

It is not currently proposed but it is possible, in some implementations, that the Network Resource Identifier (NRI) could be used to uniquely identify a particular SGSN in the pool area.

Turning again to FIG. 5, once the source eNB 510 has addressed the target SGSN 514, according to the current UMTS specification, the target SGSN 514 addresses the target RNC 512. That is, the target SGSN 514 forwards the Relocation Request to the target RNC 512 according to the RNC identifier received from the source system. However, in the case of Inter-RAT handover, the source eNB 510 does not know the identifier of the target RNC 512.

In one exemplary embodiment, the routing information in the target SGSN 514 is changed to enable the target SGSN 514 to address the target RNC 512 based on the Global-CID. The Global-CID is sent from the source eNB 510 to the target SGSN 514. The target SGSN 514 is arranged to store the structure of the Radio Access Network (RAN) and a mapping between the Global-CID and the RNC identifier. Hence the target SGSN 514 can address the target RNC 512 based on the Global-CID. The mapping between the Global-CID and the RNC identifier may be stored internally or the SGSN may query an external database, such as a Domain Name Server (DNS) to obtain the target RNC identifier.

In an alternative exemplary embodiment, the UTRAN network may be changed so that, together with the Global-CID, the RNC identifier of the target cell is also broadcast. The UE 516 would then report the identifier of the target RNC 512 to the source eNB 510 with the Global-CID when the cell is detected. Hence the source eNB 510 can address the target SGSN 514 and provide the identifier of the target RNC 512 in the Handover Request message.

Alternatively, the source eNB 510 may be configured to query a lookup table using the Global-CID, which will then return the corresponding RNC identifier. This may then be transmitted to the target SGSN 514 as set out above.

Advantageously, the present systems and methods described my enable handover from LTE to UMTS networks without requiring pre-configuration in the source eNB of the LTE network.

Figure 8:
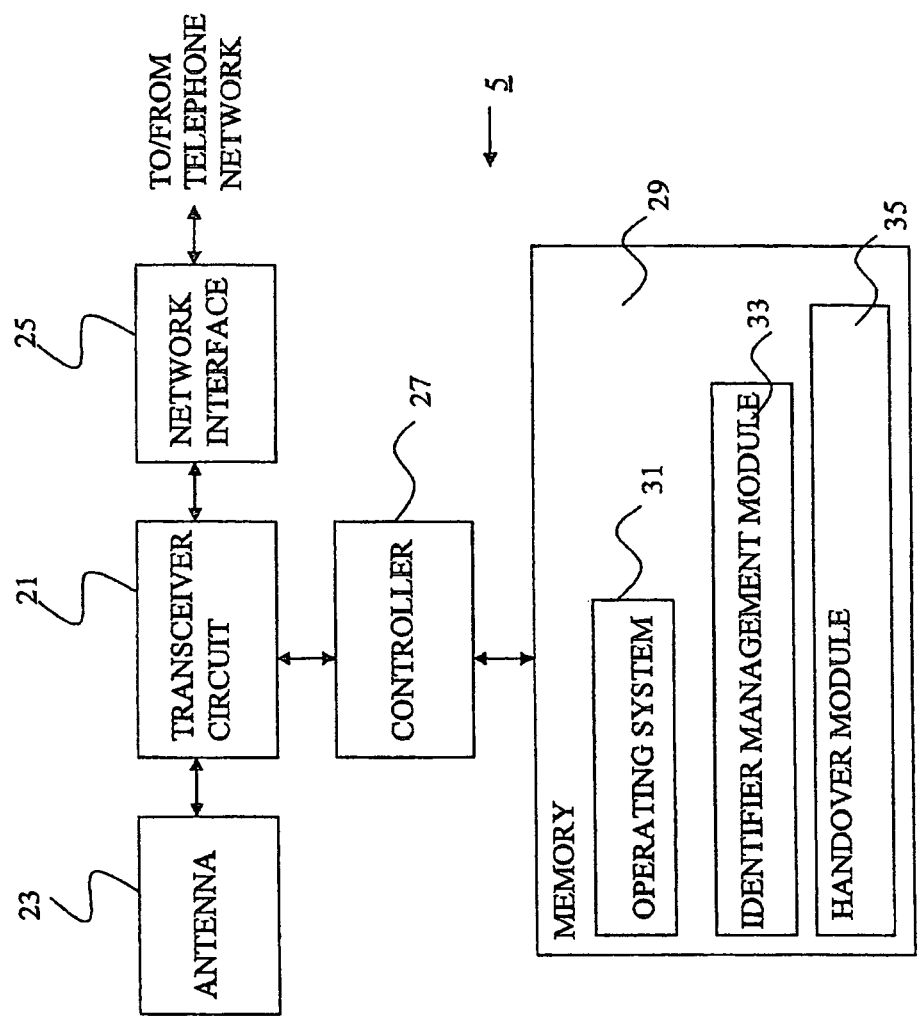
FIG. 8 is a block diagram illustrating the main components of one of the base stations shown in FIG. 1.

FIG. 8 is a block diagram illustrating the main components of one of the base stations 5 shown in FIG. 1 and used in an exemplary embodiment of the invention. As shown, the base station 5 includes a transceiver circuit 21 which is operable to transmit signals to and to receive signals from the mobile telephones 3 via one or more antennae 23 and which is operable to transmit signals to and to receive signals from the telephone network 7 via a network interface 25. The operation of the transceiver circuit 21 is controlled by a controller 27 in accordance with software stored in memory 29. The software includes, among other things, an operating system 31, an Identifier Management Module 33 and a Handover Module 35. The Identifier Management Module 33 is operable for requesting information relating to identifiers of target gateway and base station components and of storing, processing and managing this information. As shown in FIG. 3, the software also includes a Handover module 35 for generating and transmitting handover requests based on the identifier information.

Figure 9:
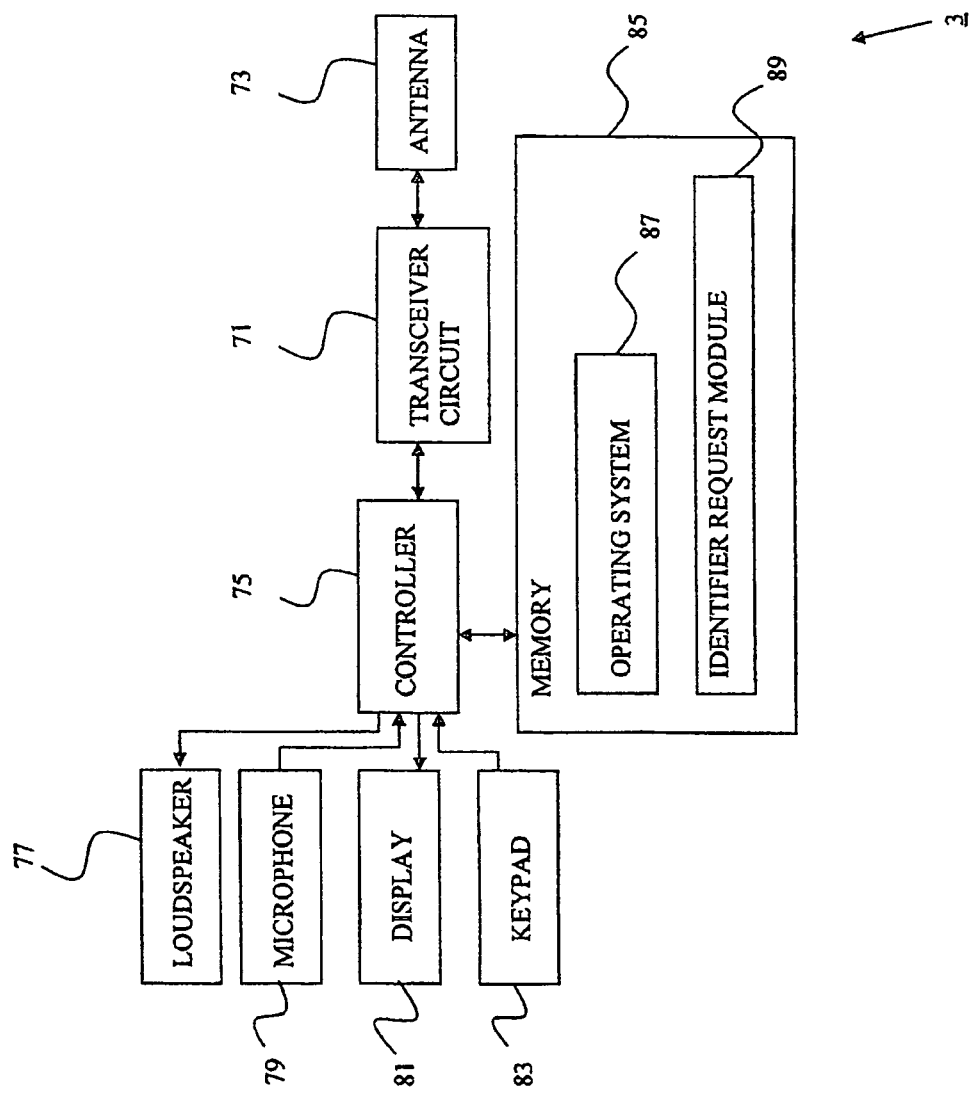
FIG. 9 is a block diagram illustrating the main components of one of the mobile telephones shown in FIG. 1.

FIG. 9 is a block diagram illustrating the main components of one of the mobile telephones shown in FIG. 1 according to one exemplary embodiment. As shown, the mobile telephones 3 include a transceiver circuit 71 which is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 and an Identifier Request Module 89. The identifier request module 89 is operable to request identifiers, such as Global-CID and RAC identifier and manage the transmission of this information to base station components in the network.

Figure 10:
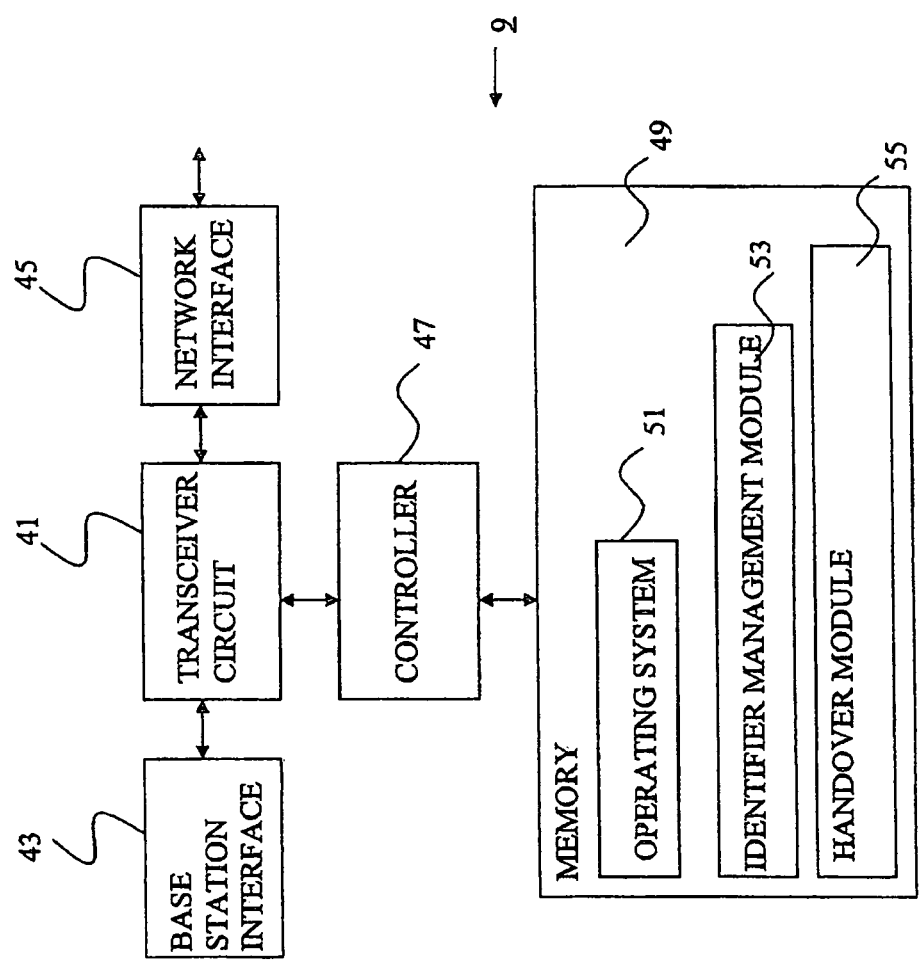
FIG. 10 is a block diagram illustrating the main components of one of the gateways shown in FIG. 2.

FIG. 10 is a block diagram illustrating the main components of each of the gateway components 9 used in this exemplary embodiment. As shown, each gateway 9 includes a transceiver circuit 41, which is operable to transmit signals to and to receive signals from at least controller 214-1 via a base station interface 43 and which is operable to transmit signals to and receive signals from the rest of the telephone network 7 via a network interface 45. A controller 47 controls the operation of the transceiver circuit 41 in accordance with software stored in memory 49. The software includes, among other things, an operating system 51, an identifier management module 53 for obtaining and handling identifiers of target base stations and a handover module 55 for receiving and handling handover requests.

In the above description, the base stations 5, the gateways 9 and the mobile telephones 3 are described for ease of understanding as having respective discrete modules which operate according to the methods described herein. Whilst the features may be provided in this way for certain applications, for example where an existing system has been modified to implement the invention, in other applications, for example in systems designed with the inventive features in mind from the outset, these features may be built into the overall operating system or code and so the modules described above may not be discernable as discrete entities.

Hence, Inter-RAT handover of UEs may be achieved using the systems and methods described above.

While the invention has been particularly shown and described with reference to exemplary embodiments thereof, the invention is not limited to these embodiments. It will be understood by those ordinary skill in the art that various changes in form and details may be made therein without departing from the sprit and scope of the present invention as defined by the claims.

GLOSSARY OF 3GPP TERMS

LTE—Long Term Evolution (of UTRAN)
eNodeB—E-UTRAN Node B
AGW—Access Gateway
UE—User Equipment—mobile communication device
DL—downlink-link from base to mobile
UL—uplink-link from mobile to base
AM—Acknowledge Mode
UM—Unacknowledge Mode
MME—Mobility Management Entity
UPE—User Plane Entity
CN—Core Network
HO—Handover
RAN—Radio Access Network
RANAP—Radio Access Network Application Protocol
RLC—Radio Link Control
RNC—Radio Network Controller
RRC—Radio Resource Control
RRM—Radio Resource Management
SDU—Service Data Unit
SRNC—Serving Radio Network Controller
PDU—Protocol Data Unit
NAS—Non Access Stratum
ROHC—Robust Header Compresion
TA—Tracking Area
U-plane or UP—User Plane
TNL—Transport Network Layer
S1 Interface—Interface between Access Gateway and eNodeB
X2 Interface—Interface between two eNodeBs
MMEs/SAE Gateway—Access Gateway having both MME and UPE entities
Global-CID—Global Cell Identity
SGSN—Serving GPRS Support Node
LAC—Location Area Code
RAC—Routing Area Code The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Title: Inter-RAT ANR Enhancement: Target Node Addressing in UTRAN

1 Introduction

In the last RAN3 meeting, stage 2 specifications have been updated in order to include the ANR IRAT functionality.

This proposal focuses to the LTE-UTRAN scenario. In particular this contribution proposes necessary enhancement to the functionality to allow the addressing of the target node in the target node in UTRAN.

2 RAN3 Current Status

Below is a summary of the ANR IRAT, illustrated in FIG. 3:

- The eNB instructs the UE to look for neighbor cells in the target RATs/frequencies
- The UE reports the Phy-CID of the detected cells in the target RATs/frequencies. The Phy-CID is defined by the Primary Scrambling Code (PSC) in case of UTRAN FDD cell, by the cell parameter ID in case of UTRAN TDD cell and by the BSIC in case of GERAN cell
- The eNB instructs the UE, to read the Global-CID of the detected neighbour cell in the target RAT/frequency. It is FFS how this is achieved
- The UE reports the detected Global-CIDs to the serving cell eNB
- The eNB updates its inter-RAT/frequency neighbour relation list.

2.1 Discussion

Execution of the IRAT HO involves addressing the target node. This issue can be split into two main issues:
- Addressing the target SGSN
- Addressing the target RNC.

The only information the eNB knows about the target system is the Global cell id of the reported cell.

According to [1], Global cell id or Global cell definition is defined as illustrated in FIG. 4.

As explained below, this information is not enough for the source eNB to address the target node in UTRAN.

2.1.1 Target SGSN Addressing

Following information are needed to address the target SGSN
- PLMN id (MCC and MNC)
- LAC
- RAC RAC is needed since one Location Area may cover more than one SGSN service area (see below).

FIG. 6 illustrates Location Area and SGSN Serving Area

Proposal 1: UE should report the RAC of the target cell together with the target Global cell id. UE will read the RAC from the CN system information in the SIB 1.

In case of Iu Flex, the target RNC will be connected to all the SGSN in the pool area, i.e. same RAC may be served by more than one SGSN. In this case, the target SGSN is addressed as follow:

- Together with the PLMN id, LAC and RAC, also the NRI is needed to identify the target SGSN
- The NRI is used to identify the SGSN in a pool area FIG. 7 illustrates a possible Iu flex scenario Proposal 2: no use of NRI will be made from the source system in order to address the target SGSN in a pool area i.e. always the default SGSN will be addressed.

2.1.2 Target RNC Addressing

According to the current UMTS specification, target SGSN address the target RNC e.g. forward the Relocation Request to the target RNC according to the RNC id received from the source system.

In the case of IRAT ANR, the source eNB does not know the target RNC id. In order to allow the addressing of the target RCN, following proposals are listed:

Proposal 3:
Changing the routing information in the SGSN in order to allow the RNC to be addressed by means of Global cell id. As a consequence:

Global cell id to be send to the target SGSN
SGSN should either know the structure of cells in the RAN and store the mapping Global cell id-RNC id or querying the DNS to get it.

Proposal 4
Change the System information in UTRAN so that the RNC id is also broadcasted. The UE would then reports the RNC id to the source eNB whenever the cell is detected Proposal 5
Query a look up table with the Global cell id in order to get the RNC id back which will then be informed to the target SGSN 3 Conclusion In this contribution we propose to enhance the IRAT ANR in order to allow the target node in UTRAN to be addressed.

It is proposed to discuss the contribution and agree on the proposals in section 2. NEC is available to prepare the necessary CRs to update the stage 2 specification accordingly.

4 Reference

[1] 23.003: Technical Specification Group Core Network and Terminals; Numbering, addressing and identification

The invention claimed is:

1. A method, performed by a base station, of facilitating handover of a user device between the base station when operating as a source base station component in a first communications network of a first network type and a target base station component in a second communications network of a second network type, the method comprising:

receiving, from a user device, a global cell identifier of a cell in the second communications network, wherein information for forming a Location Area Identification 'LAI' can be obtained from the global cell identifier, and a Routing Area Code 'RAC' for use in identifying a target gateway component operating within a location area represented by said Location Area Identification 'LAI' and associated with the neighbor base station component;

generating a handover request message in the first communications network, for handing over to said neighbor base station component operating as said target base station component, the handover request message incorporating the Routing Area Code 'RAC' and said Location Area Identification 'LAI'; and transmitting the handover request message to facilitate said handover to the second communications network.

2. The method according to claim 1, further comprising sending a request message to the user device to request that the user device obtain the global cell identifier and the Routing Area Code 'RAC' for use in identifying the target gateway component.

3. The method according to claim 2, wherein the user device extracts the global cell identifier and the Routing Area Code 'RAC' for use in identifying the target gateway component from system information broadcast by the second communications network.

4. The method according to claim 1, wherein the first network type comprises E-UTRAN (Evolved-Universal Terrestrial Radio Access Network).

5. The method according to claim 1, wherein the second network type comprises UTRAN (Universal Terrestrial Radio Access Network).

6. The method according to claim 1, wherein the second network type comprises GERAN (GSM (Global System for Mobile communications)/EDGE (Enhanced Data rates for Global Evolution) Radio Access Network).

7. A base station for facilitating a handover of a user device from the base station when operating as a source base station component in a first communications network of a first network type to a target base station component in a second communications network of a second network type, the base station comprising:
    means for receiving, from a user device, a global cell identifier of a cell in the second communications network, wherein information for forming a Location Area Identification 'LAI' can be obtained from the global cell identifier, and a Routing Area Code 'RAC' for use in identifying a target gateway component operating within a location area represented by said Location Area Identification 'LAI' and associated with the neighbor base station component;
    means for generating a handover request message in the first communications network, for handing over to said neighbor base station component operating as said target base station component, the handover request message incorporating the Routing Area Code 'RAC' and said Location Area Identification 'LAI'; and
    means for transmitting the handover request message to facilitate said handover to the second communications network.

8. The base station according to claim 7, further comprising means for sending a request message to the user device to request that the user device obtain the global cell identifier and the Routing Area Code 'RAC' for use in identifying the target gateway component.

9. The base station according to claim 7, wherein the first network type comprises E-UTRAN (Evolved-Universal Terrestrial Radio Access Network).

10. The base station according to claim 7, wherein the second network type comprises UTRAN (Universal Terrestrial Radio Access Network).

11. The base station according to claim 7, wherein the second network type comprises GERAN (GSM (Global System for Mobile communications)/EDGE (Enhanced Data rates for Global Evolution) Radio Access Network).

12. A method, performed by a user device, of communicating with a base station to facilitate a handover from the base station when operating as a source base station component in a first communications network of a first network type to a target base station component in a second communications network, the method comprising:
    obtaining a global cell identifier of a cell of a neighbor base station component in the second communications network, wherein information for forming a Location Area Identification 'LAI' can be obtained from the global cell identifier;
    obtaining a Routing Area Code 'RAC' for use in identifying a gateway component operating within a location area represented by said Location Area Identification 'LAI' and associated with the neighbor base station component; and \
    transmitting the global cell identifier from which information for forming the Location Area Identification 'LAI' can be obtained and the Routing Area Code 'RAC' for use in identifying the gateway component to the source base station component of the first communications network to facilitate handover from the source base station component to the neighbor base station component operating as said target base station component.

13. The method according to claim 12, wherein obtaining comprises receiving information broadcast by the cell in the second communications network.

14. A user device for communicating with a base station to facilitate a handover from the base station when operating as a source base station component in a first communications network of a first network type to a target base station component in a second communications network, the user device comprising:
    means for obtaining a global cell identifier of a cell of a neighbor base station component in the second communications network, wherein information for forming a Location Area Identification 'LAI' can be obtained from the global cell identifier;
    means for obtaining a Routing Area Code 'RAC' for use in identifying a gateway component operating within a location area represented by said Location Area Identification 'LAI' and associated with the neighbor base station component; and
    means for transmitting the global cell identifier from which information for forming the Location Area Identification 'LAI' can be obtained and the Routing Area Code 'RAC' for use in identifying the gateway component to the base station component of the first communications network to facilitate handover from the source base station component to the neighbor base station component operating as said target base station component.

15. The user device according to claim 14, wherein the means for obtaining comprises means for receiving information broadcast by the cell in the second communications network.

16. A base station for facilitating a handover of a user device from the base station when operating as a source base station component in a first communications network of a first network type to a target base station component in a second communications network of a second network type, the base station comprising:
    a receiver for receiving, from a user device, a global cell identifier of a cell in the second communications network, wherein information for forming a Location Area Identification 'LAI' can be obtained from the global cell identifier, and a Routing Area Code 'RAC' for use in identifying a target gateway component operating within a location area represented by said Location Area Identification 'LAI' and associated with the neighbor base station component;
    a controller generating a handover request message in the first communications network, for handing over to said neighbor base station component operating as said target base station component, the handover request message incorporating the Routing Area Code 'RAC' and said Location Area Identification 'LAI'; and
    a transmitter for transmitting the handover request message to facilitate said handover to the second communications network.

17. The base station according to claim 16, wherein the transmitter transmits a request message to the user device to request that the user device obtain the global cell identifier and the Routing Area Code 'RAC' for use in identifying the target gateway component.

18. The base station according to claim 16, wherein the first network type comprises E-UTRAN (Evolved-Universal Terrestrial Radio Access Network) and the second network type comprises one of a UTRAN (Universal Terrestrial Radio Access Network) and a GERAN (GSM (Global System for Mobile communications)/EDGE (Enhanced Data rates for Global Evolution) Radio Access Network).

19. A user device for communicating with a base station to facilitate a handover from the base station when operating as a source base station component in a first communications network of a first network type to a target base station component in a second communications network, the user device comprising:
- a receiver for obtaining a global cell identifier of a cell of a neighbor base station component in the second communications network, wherein information for forming a Location Area Identification 'LAI' can be obtained from the global cell identifier;
- wherein the receiver obtains a Routing Area Code 'RAC' for use in identifying a gateway component operating within a location area represented by said Location Area Identification 'LAI' and associated with the neighbor base station component; and
- transmitter for transmitting the global cell identifier from which information for forming the Location Area Identification 'LAI' can be obtained and the Routing Area Code 'RAC' for use in identifying the gateway component to the base station component of the first communications network to facilitate handover from the source base station component to the neighbor base station component operating as said target base station component.

20. The user device according to claim 19, wherein the receiver further receives information broadcast by the cell in the second communications network.

* * * * *